Dec. 4, 1923.  1,476,054

P. G. COLE

VALVE CAP

Filed Nov. 29, 1921

Inventor:
Philip Gillett Cole,
By Attorneys,

Patented Dec. 4, 1923.

1,476,054

UNITED STATES PATENT OFFICE.

PHILIP GILLETT COLE, OF FOREST HILLS, NEW YORK, ASSIGNOR TO A. SCHRADER'S SON, INCORPORATED, OF BROOKLYN, NEW YORK, A CORPORATION OF NEW YORK.

VALVE CAP.

Application filed November 29, 1921. Serial No. 518,628.

*To all whom it may concern:*

Be it known that I, PHILIP GILLETT COLE, a citizen of the United States of America, residing at No. 63 Greenway North, in Forest Hills, in the county of Queens and State of New York, have invented certain new and useful Improvements in Valve Caps, of which the following is a specification.

This invention relates to caps for pneumatic tire valves and similar devices, and aims to provide certain improvements therein.

In certain types of pneumatic tire valves it is customary to provide a bushing usually formed as a part of the rim nut, which bushing is threaded on its exterior and is designed to receive the threaded end of the dust cap. Such caps with bushings are usually used on the smaller size of valves, which, however, employ the standard sized nipples and standard sized valve caps so that it is necessary to remove the valve cap in order to apply the bushing or remove it. The dust cap, however, engaging the exterior of the bushing is capable of passing over the valve cap. It occasionally happens in use that the dust cap is very tightly adjusted on the bushing so that when the dust cap is removed the bushing is unscrewed with it. The bushing being unable to pass the valve cap it is very difficult to remove the structure from the valve.

According to the present invention, I provide a construction of valve cap which, while having adequate strength, is capable of being passed by the bushing. To this end I provide on the valve cap a series of external threads which match the internal threads on the bushing so that the latter after leaving the threads of the valve casing may take up an engagement with the threads on the valve cap and screw outwardly off the valve.

In the drawings wherein I have shown one form of the invention:

Figure 6:
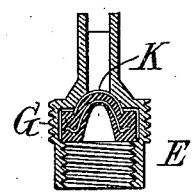
Fig. 6 is a diametrical section of the valve cap.

Referring to the drawings, let A indicate a valve casing or "stem" which is shown as projected through the rim B, having screwed thereon a rim nut bushing C. The exterior of the bushing is screw-threaded, as shown, for engagement with the dust cap D, which is provided at its lower end with internal threads for this purpose. E is the valve cap provided by the present invention which is adapted to screw on the nipple F, it being provided with internal threads and a packing washer which are well known and which are shown in Fig. 6.

The valve cap E is also formed according to the present invention with a threaded part G which is adapted to be engaged by the internal thread H of the bushing. This permits the bushing to screw off over the valve cap in case the dust cap becomes fixed to the bushing. It also permits the rim nut in ordinary applications or removals to be passed over the cap. At the same time, the threaded part of the cap increases the strength of construction at the point where the strain generally comes, namely, where the packing washer is engaged by the valve nipple and where it presses against the top of the cap, and also permits the cap to be recessed to receive the packing washer as shown in Fig. 6. The antifriction dome K of the latter is best of small diameter.

Figure 1:
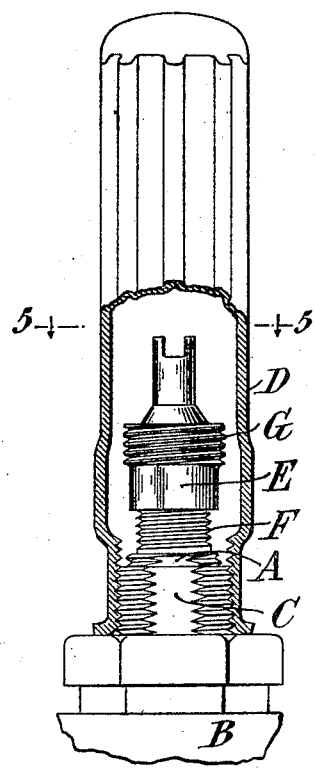
Figure 1 is an elevation of the valve cap and rim nut, the dust cap being shown partly in elevation and partly in section.
Figure 3:
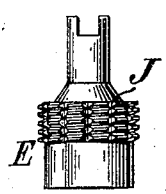
Fig. 3 is an elevation of another form of valve cap.
Figure 4:
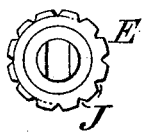
Fig. 4 is a plan.
Figure 2:
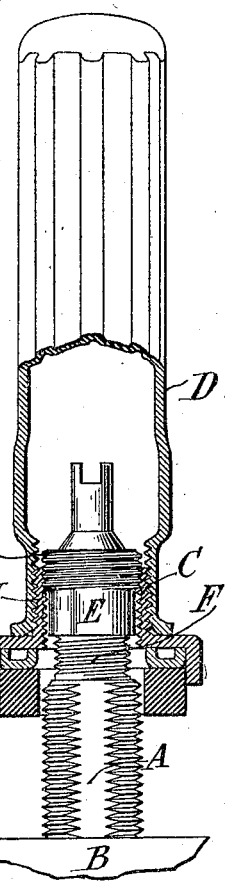
Fig. 2 is a similar view, the dust cap and rim nut being shown as screwing past the valve cap.
Figure 5:
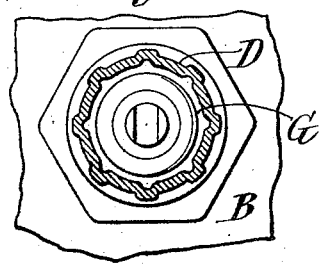
Fig. 5 is a section on the line 5—5 in Figure 1.

If desired, the threads may be cross-cut or knurled, as indicated at J in Fig. 3, so as to make a more secure finger hold for manipulating the cap.

It will be understood that the threads on the valve cap are preferably of substantially the same pitch as the external threads on the valve casing A. It will also be understood that the distance between the two threads when the valve cap is screwed home is preferably greater than the axial depth of the threaded part of the bushing so that the bushing thread will leave the valve thread before it strikes the cap thread. This enables the bushing to be readjusted to fit the cap thread should the two threads be out of line with each other.

While I have shown and described one form of the invention, it will be understood that I do not wish to be limited thereto, since various changes may be made therein without departing from the spirit of the invention.

What I claim is:

1. A valve cap having an exterior threaded part adapted to engage the threads of a member which in turn is adapted to engage the threads of a valve casing upon which the valve cap is adapted to fit.

2. A valve cap having on its exterior a threaded part adapted to engage the threads of a bushing or the like, which in turn is adapted to engage the threads of a valve casing, said threaded part being crosscut or knurled.

3. The combination of a valve casing and a valve cap, each being threaded on its exterior and the pitch of the threads on the valve cap being substantially the same as that of the threads on the valve casing.

4. The combination of a valve casing having an exterior thread and bushing adapted to screw on said thread, and a valve cap having an exterior thread designed to engage the threads of the bushing to permit the bushing to screw over the cap.

5. The combination of a valve casing having an exterior thread and bushing adapted to screw on said thread, and a valve cap having an exterior thread designed to engage the threads of the bushing to permit the bushing to screw over the cap, and the distance between the threads on the cap and the threads on the valve casing being greater than the depth of the threaded part of the bushing.

6. A valve cap having a body portion which is screw threaded both internally and externally.

7. A valve cap having a body portion which is screw threaded both internally and externally, the external thread being crosscut or knurled without impairing its utility.

In witness whereof, I have hereunto signed my name.

PHILIP GILLETT COLE.